United States Patent
Sharma et al.

(10) Patent No.: US 9,509,593 B2
(45) Date of Patent: Nov. 29, 2016

(54) SYSTEMS AND METHODS FOR DIVERSE CONNECTION SIGNALING FROM DISPARATE SOURCE NODES IN DISTRIBUTED CONNECTION-ORIENTED NETWORKS

(71) Applicants: Piyush Sharma, Gurgaon (IN); Waseem Reyaz Khan, Gurgaon (IN); Ramanjit Walia, Gurgaon (IN); Darek Skalecki, Ottawa (CA); Gerard Swinkels, Ottawa (CA)

(72) Inventors: Piyush Sharma, Gurgaon (IN); Waseem Reyaz Khan, Gurgaon (IN); Ramanjit Walia, Gurgaon (IN); Darek Skalecki, Ottawa (CA); Gerard Swinkels, Ottawa (CA)

(73) Assignee: Ciena Corporation, Hanover, MD (US)

( * ) Notice: Subject to any disclaimer, the term of this patent is extended or adjusted under 35 U.S.C. 154(b) by 197 days.

(21) Appl. No.: 14/294,350

(22) Filed: Jun. 3, 2014

(65) Prior Publication Data
US 2015/0304159 A1 Oct. 22, 2015

(30) Foreign Application Priority Data
Apr. 22, 2014 (IN) .......................... 1092/DEL/2014

(51) Int. Cl.
H04L 12/707 (2013.01)
H04L 12/24 (2006.01)

(52) U.S. Cl.
CPC ........... *H04L 45/24* (2013.01); *H04L 41/0663* (2013.01)

(58) Field of Classification Search
CPC ........... H04L 12/5695; H04L 41/0686; H04L 41/08; H04L 41/12; H04L 45/22; H04L 47/10; H04L 47/12; H04L 47/745; H04L 47/748; H04L 41/0663; H04Q 11/0062; H04Q 11/0066; H04Q 2011/0073; H04Q 2011/0081; H04Q 2011/0086
See application file for complete search history.

(56) References Cited

U.S. PATENT DOCUMENTS

| | | | |
|---|---|---|---|
| 5,940,396 A * | 8/1999 | Rochberger | H04Q 11/0478 370/256 |
| 6,154,444 A * | 11/2000 | Masuo | H04Q 3/66 370/225 |
| 6,195,354 B1 | 2/2001 | Skalecki et al. | |
| 6,215,765 B1 * | 4/2001 | McAllister | H04L 45/10 370/217 |
| 6,222,820 B1 | 4/2001 | Hamami | |
| 6,778,535 B1 * | 8/2004 | Ash | H04L 45/10 370/238.1 |
| 6,914,912 B1 | 7/2005 | Skalecki et al. | |
| 6,963,926 B1 * | 11/2005 | Robinson | H04L 45/10 370/389 |
| 7,002,906 B1 * | 2/2006 | Basso | H04L 12/5601 370/218 |
| 7,376,086 B1 | 5/2008 | Paraschiv | |
| 7,391,720 B1 | 6/2008 | Kuditipudi et al. | |

(Continued)

Primary Examiner — Michael Thier
Assistant Examiner — Eric Nowlin
(74) Attorney, Agent, or Firm — Clements Bernard PLLC; Christopher L. Bernard; Lawrence A. Baratta, Jr.

(57) ABSTRACT

A method in a network utilizing a distributed connection-oriented control plane includes signaling a first path for a first connection from a first source node; storing call information for the first connection at any intermediate nodes in the first path; signaling a second path for a second connection from a second source node; checking at any intermediate nodes in the second path if there is absolute route diversity between the first connection and the second connection responsive to a requirement therein; and responsive to detecting a diversity violation at an intermediate node of the any intermediate nodes in the second path, signaling a crankback to the second source node with the call information for the first connection included therein; and recomputing the second path exclusive of the first path based on the call information responsive to receiving the crankback. A network and node are also described.

19 Claims, 6 Drawing Sheets

(56) References Cited

U.S. PATENT DOCUMENTS

| | | | |
|---|---|---|---|
| 7,561,512 B1* | 7/2009 | Chellappa | H04L 12/66 370/217 |
| 7,630,377 B1* | 12/2009 | Cortez | H04L 12/5695 370/216 |
| 7,639,793 B1* | 12/2009 | Croak | H04L 45/22 379/219 |
| 7,756,009 B1 | 7/2010 | Boer et al. | |
| 7,804,778 B1* | 9/2010 | Begalke | H04L 12/24 370/234 |
| 8,125,925 B2 | 2/2012 | Skalecki et al. | |
| 8,135,846 B2 | 3/2012 | Shew et al. | |
| 8,402,121 B2 | 3/2013 | Skalecki et al. | |
| 8,509,055 B2 | 8/2013 | Khan et al. | |
| 8,553,707 B2 | 10/2013 | Swinkels et al. | |
| 8,666,247 B2 | 3/2014 | Srinivasan et al. | |
| 8,682,160 B2 | 3/2014 | Prakash et al. | |
| 8,787,208 B2* | 7/2014 | Bhamare | H04L 12/4658 370/255 |
| 2003/0099014 A1* | 5/2003 | Egner | H04J 14/0227 398/79 |
| 2003/0177263 A1* | 9/2003 | Robinson | H04L 45/00 709/239 |
| 2004/0114508 A1* | 6/2004 | Rajsic | H04L 45/04 370/216 |
| 2005/0010681 A1* | 1/2005 | Katukam | H04L 12/43 709/238 |
| 2006/0291381 A1* | 12/2006 | Weedmark | H04L 12/5601 370/228 |
| 2008/0130677 A1 | 6/2008 | Attarwala et al. | |
| 2008/0212497 A1 | 9/2008 | Getachew et al. | |
| 2010/0074101 A1 | 3/2010 | Skalecki et al. | |
| 2011/0153549 A1* | 6/2011 | Cherng | H04L 41/0873 707/603 |
| 2014/0044008 A1 | 2/2014 | Skalecki et al. | |
| 2015/0334005 A1* | 11/2015 | Tripathi | H04Q 11/0066 398/5 |
| 2016/0036520 A1* | 2/2016 | Swinkels | H04L 45/00 398/1 |

* cited by examiner

SYSTEMS AND METHODS FOR DIVERSE CONNECTION SIGNALING FROM DISPARATE SOURCE NODES IN DISTRIBUTED CONNECTION-ORIENTED NETWORKS

CROSS-REFERENCE TO RELATED APPLICATION(S)

The present patent application/patent claims the benefit of priority of Indian Patent Application No. 1092/DEL/2014, filed on Apr. 22, 2014, and entitled "SYSTEMS AND METHODS FOR DIVERSE CONNECTION SIGNALING FROM DISPARATE SOURCE NODES IN DISTRIBUTED CONNECTION-ORIENTED NETWORKS," the contents of which are incorporated in full by reference herein.

FIELD OF THE DISCLOSURE

The present disclosure relates generally to networking systems and methods. More particularly, the present disclosure relates to distributed connection-oriented control planes (e.g., GMPLS, ASON, OSRP, PNNI, etc.) where connections (e.g., SNCs, SNCPs, LSPs, etc.) need to be diversely established in the network and such connections originate on disparate source nodes

BACKGROUND OF THE DISCLOSURE

In optical networks, distributed control planes provide automatic allocation of network resources in an end-to-end manner. Exemplary control planes may include Automatically Switched Optical Network (ASON) as defined in G.8080/Y.1304, Architecture for the automatically switched optical network (ASON) (February 2005), the contents of which are herein incorporated by reference; Generalized Multi-Protocol Label Switching (GMPLS) Architecture as defined in Request for Comments (RFC): 3945 (October 2004) and the like, the contents of which are herein incorporated by reference; Optical Signaling and Routing Protocol (OSRP) from Ciena Corporation which is an optical signaling and routing protocol similar to PNNI (Private Network-to-Network Interface), the contents of which are herein incorporated by reference; or any other type distributed control plane for controlling network elements at one or more layers, and establishing connections there between. These control planes may be referred to as data control planes as they deal with routing signals such as Synchronous Optical Network (SONET), Synchronous Digital Hierarchy (SDH), Optical Transport Network (OTN), Ethernet, and the like. These control planes are referred to as distributed control planes in that control plane functions are allocated across multiple devices or network elements. These control planes typically use source-based routing where a source node or network element determines an overall end-to-end signaled path through the network. Examples of end-to-end signaled paths in control planes include sub-network connections (SNCs) in ASON or OSRP, label switched paths (LSPs) in GMPLS, subnetwork connection protection (SNCP), etc. All control planes use the available paths to route the services and program the underlying hardware.

In various circumstances, two signaled paths may require absolute route diversity (ARD) therebetween such as for protection and the like. In this sense, the two signaled paths can be said to be related such as two legs of an SNCP, 1+1/1:1 working and protect paths, etc. In a conventional situation, in a source-based routed, distributed control plane where the two signaled paths originated on the same source node, the source node performing path computation simply has to ensure that absolute route diversity is considered in path computation. However, consider the case in a source-based routed, distributed control plane where the two signaled paths originate on a different source node, it is not possible to ensure absolute route diversity in the path computation because the path computation is performed on the different source nodes independently. From a terminology perspective, the two signaled paths originating on the same source node and terminating on a same destination node can be referred to as a Close-Close service. The two signaled paths originating on different source nodes and terminating on different destination nodes can be referred to as an Open-Open service. The two signaled paths originating on different source nodes and terminating on a same destination node can be referred to as an Open-Close service. Finally, the two signaled paths originating on the same source node and terminating on different destination nodes can be referred to as a Close-Open service. For example, SNCP legs can be referred to as Open-Open SNCP, Close-Close SNCP, etc. Other types of services besides SNCP can also use this terminology. Also, more than two paths may be required, e.g., all SNCP configurations include two paths, but other types of services can required two or more paths that need to be diversely routed.

Disadvantageously, it is not possible conventionally to ensure absolute route diversity with Open-Open services or Open-Close services in source-based routed, distributed control planes due to the lack of information between the different source nodes during path computation.

BRIEF SUMMARY OF THE DISCLOSURE

In an exemplary embodiment, a method in a network utilizing a distributed connection-oriented control plane includes signaling a first path for a first connection from a first source node; storing call information for the first connection at any intermediate nodes in the first path; signaling a second path for a second connection from a second source node; checking at any intermediate nodes in the second path if there is absolute route diversity between the first connection and the second connection responsive to a requirement therein; and responsive to detecting a diversity violation at an intermediate node of the any intermediate nodes in the second path, signaling a crankback to the second source node with the call information for the first connection included therein. The method further includes recomputing the second path exclusive of the first path based on the call information responsive to the crankback. The method can further include checking at any intermediate nodes in the second path if there is nodal and/or link diversity based on the requirement, wherein the requirement is communicated in a setup message associated with the second connection. The method can further include failing to recompute the second path exclusive of the first path based on the call information responsive to the crankback due to no available diverse path; recomputing the second path to be maximally diverse from the first path sharing as few nodes or links as possible with the first path; and signaling the second path instructing the any intermediate nodes to not check for the absolute route diversity. The method can further include responsive to not detecting the diversity violation at the any intermediate nodes in the second path, establishing the second connection without requiring call coordination between the first connection and the second connection.

The first connection and the second connection can include any of an Open-Open service, an Open-Close service, a Close-Open service, and a Close-Close service. The first connection and the second connection can include any of the Close-Open service and the Close-Close service, and the checking is not performed due to a lack of the requirement. The distributed connection-oriented control plane can include any of Automatically Switched Optical Network (ASON), Generalized Multi-Protocol Label Switching (GMPLS), Optical Signaling and Routing Protocol (OSRP), and Private Network to Network Interface (PNNI). The method can further include storing call information for the second connection at the any intermediate nodes in the second path, wherein the first connection and the second connection are part of N connections; establishing the N connections as diverse therebetween with a maximum of N−1 crankbacks. The call information can include a Designated Transit List (DTL) or an Explicit Route Object (ERO). The first connection and the second connection can be part of a subnetwork connection protection (SNCP) with the first source node and the second source node being different. The first connection and the second connection can include any of a subnetwork connection (SNC), a subnetwork connection protection (SNCP), and a label switched path (LSP) computed by a source node and established by the distributed connection-oriented control plane. The method can further include performing the signaling the first path or signaling the second path responsive to restoration from a failure or as part of connection maintenance.

In another exemplary embodiment, a network utilizing a distributed connection-oriented control plane includes a plurality of nodes interconnected therebetween by a plurality of links, wherein the distributed connection-oriented control plane operates between the plurality of nodes; wherein, responsive to control plane signaling for a new connection, any intermediate nodes of the plurality of nodes in a path for the new connection store associated call information for the new connection; wherein, responsive to control plane signaling for a subsequent connection after the new connection and a requirement for absolute route diversity with the new connection and any other connections, any intermediate nodes of the plurality of nodes in a path for the subsequent connection check for the absolute route diversity based on stored call information; and wherein, responsive to a diversity violation at an intermediate node of the any intermediate nodes in the path for the subsequent connection, a crankback is sent to a source node of the subsequent connection with relevant stored call information included therein.

The source node of the subsequent connection can recompute the path for the subsequent connection with the relevant stored call information included therein responsive to the crankback. Responsive to not detecting the diversity violation at the any intermediate nodes in the path for the subsequent connection, the subsequent connection can be established without requiring call coordination. The new connection and the subsequent connection can include any of an Open-Open service, an Open-Close service, a Close-Open service, and a Close-Close service. The new connection and the subsequent connection can include any of the Close-Open service and the Close-Close service, and the checking is not performed due to a lack of the requirement. The distributed connection-oriented control plane can include any of Automatically Switched Optical Network (ASON), Generalized Multi-Protocol Label Switching (GMPLS), Optical Signaling and Routing Protocol (OSRP), and Private Network to Network Interface (PNNI). The call information can include a Designated Transit List (DTL) or an Explicit Route Object (ERO), and wherein the new connection and the subsequent connection can include any of a subnetwork connection (SNC), a subnetwork connection protection (SNCP), and a label switched path (LSP) computed by a source node of the plurality of nodes and established by the distributed connection-oriented control plane.

In yet another exemplary embodiment, a node includes a plurality of ports with switching therebetween; and a controller operating a distributed connection-oriented control plane with a plurality of additional nodes in a network; wherein if the node is a source node for a connection, the controller is configured to: compute a path for the connection in the network; signal the path with or without a requirement for absolute route diversity with another connection in the network; receive a crankback with relevant call information if an intermediate node detects a diversity violation responsive to the requirement for absolute route diversity; and recompute the path exclusive of the relevant call information; wherein if the node is an intermediate node for the connection, the controller is configured to: receive a setup message from a source node for the connection; check if there is the requirement for absolute route diversity in the setup message; and determine if there is the absolute route diversity by checking relevant stored call information, and responsive to a diversity violation, send a crankback to the source node with the relevant call information included therein, and responsive to no diversity violation, storing the relevant call information.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, systems and methods in distributed control planes with diverse connections sourced by disparate source nodes are described. The systems and methods generally include storing the current path of each connection at each intermediate node in call data and using a crankback mechanism if there is a requirement for absolute route diversity with another created connection and it is detected based on the stored call data. The first common node through which both connections are going will detect if there are any overlapping links and/or nodes between connections, and it will reject SNC setup. The idea is that this common node will return the peer's Designated Transit List (DTL) or Explicit Route Object (ERO), i.e. complete current path, in release message back to originating point. A new path can be easily calculated as diverse using the peer's DTL or ERO. The systems and methods enable Open-Open or Open-Close services with absolute route diversity to function from path computation perspective as Close-Close services or Close-Open services with absolute route diversity at a cost of just single crankback. The systems and methods allow the validation of current path of one leg of a SNCP service against the other leg current path and reject the setup via crankback to the originating node allowing it to re-calculate the current path depending upon the new criteria (excluding all the links and/or nodes of the peer current path). With the systems and methods, SNCs in Open-Open SNCP services (where two SNCP legs originating on different source nodes) are enabled to achieve absolute route diversity functionality. With this design, there is no need to interact with peer node directly saving a lot of complexity to achieve absolute route diversity for Open-Open services or Open-Close services. Additionally, the systems and methods can be used for Close-Close services or Close-Open services without performing the check at the intermediate nodes. Note, while these services are referred to as Open-Open, Open-Close, etc., the systems and methods can be used for more than two connections, e.g., an Open-Open-Open, etc.

Figure 1:
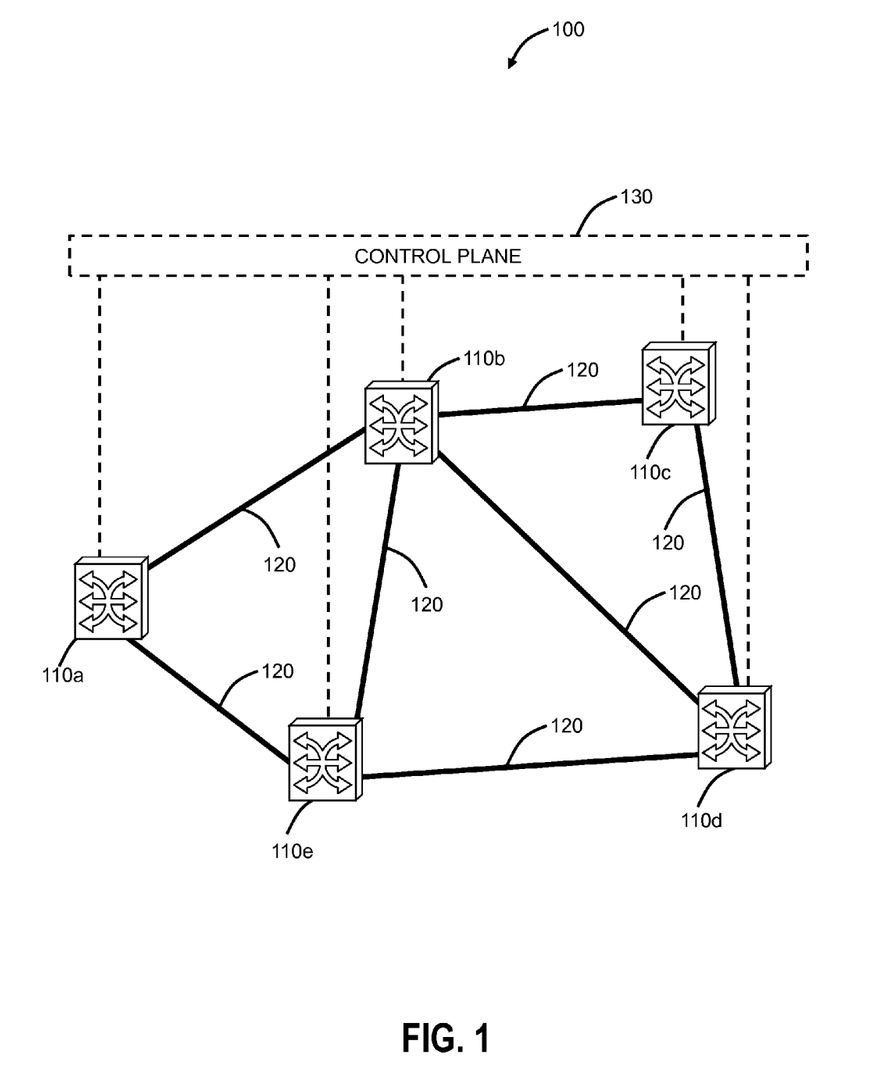
FIG. 1 is a network diagram of an exemplary network with five interconnected nodes.
Figure 2:
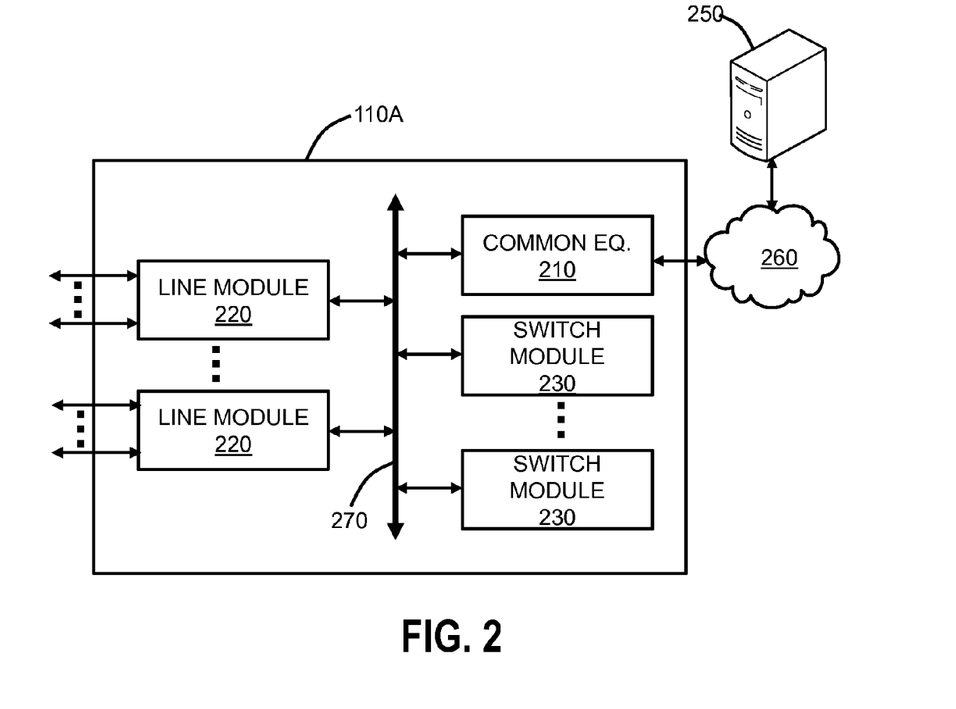
FIG. 2 is a block diagram of an exemplary node for use with the systems and methods described herein.

Referring to FIG. 1, in an exemplary embodiment, a network diagram illustrates an exemplary network 100 with five interconnected nodes 110a, 110b, 110c, 110d, 110e. The nodes 110 are interconnected through a plurality of links 120. The nodes 110 communicate with one another over the links 120. The nodes 110 can be network elements such as switches, routers, cross-connects, add/drop multiplexers, etc. which include a plurality of ingress and egress ports communicatively coupled directly or via mapping/multiplexing over the links 120. An exemplary node 110A is illustrated in FIG. 2. The network 100 is illustrated with the nodes 110 in an interconnected mesh topology for illustration purposes. Those of ordinary skill in the art will recognize that the network 100 can include more or less nodes 110 and various topologies. The network 100 can include a control plane 130 operating on and/or between the nodes 110a, 110b, 110c, 110d, 110e. The control plane 130 includes software, processes, algorithms, etc. that control configurable features of the network 100, such as automating discovery of the nodes 110, capacity on the links 120, port availability on the nodes 110, connectivity between ports; dissemination of topology and bandwidth information between the nodes 110; calculation and creation of paths for connections; network level protection and restoration; and the like. The control plane 130 is a distributed control plane and can optionally and typically does use source-based routing. In an exemplary embodiment, the control plane 130 can utilize GMPLS, ASON, OSRP, PNNI, or the like. Those of ordinary skill in the art will recognize the network 100 and the control plane 130 can utilize any type control plane for controlling the nodes 110 and establishing connections therebetween.

In the terminology of ASON and OSRP, sub-network connections (SNC) are end-to-end signaled paths since from the point of view of a client signal, each is a single network segment. In GMPLS, the SNCs are an end-to-end path referred to as a label switched path (LSP). For example, LSPs for GMPLS are described in draft-ietf-ccamp-gmpls-ospf-g709v3-13, "Traffic Engineering Extensions to OSPF for Generalized MPLS (GMPLS) Control of Evolving G.709 OTN Networks," (Dec. 11, 2013), the contents of which are incorporated by reference herein. In the various descriptions herein, reference is made to SNCs or SNCPs (which are two SNCs) for illustration only of an exemplary embodiment of the routing systems and methods. Those of ordinary skill in the art will recognize that any services can be used with the systems and methods described herein for end-to-end signaled paths.

In an exemplary embodiment, the network 100 utilizes the distributed connection-oriented control plane 130 and includes a plurality of nodes 110 interconnected therebetween by a plurality of links 120, wherein the distributed connection-oriented control plane 130 operates between the plurality of nodes 110; wherein, responsive to control plane signaling for a new connection, any intermediate nodes 110 of the plurality of nodes 110 in a path for the new connection store associated call information for the new connection; wherein, responsive to control plane signaling for a subsequent connection after the new connection and a requirement for absolute route diversity with the new connection and any other connections, any intermediate nodes 110 of the plurality of nodes 110 in a path for the subsequent connection check for the absolute route diversity based on stored call information; and wherein, responsive to a diversity violation at an intermediate node 110 of the any intermediate nodes 110 in the path for the subsequent connection, a crankback is sent to a source node 110 of the subsequent connection with relevant stored call information included therein. The source node 110 of the subsequent connection recomputes the path for the subsequent connection with the relevant stored call information included therein responsive to the crankback. Responsive to not detecting the diversity violation at the any intermediate nodes 110 in the path for the subsequent connection, the subsequent connection is established without requiring call coordination. The new connection and the subsequent connection can include any of an Open-Open service, an Open-Close service, a Close-Open service, and a Close-Close service. The new connection and the subsequent connection can include any of the Close-Open service and the Close-Close service, and the checking is not performed due to a lack of the requirement. The distributed connection-oriented control plane 130 can include any of Automatically Switched Optical Network (ASON), Generalized Multi-Protocol Label Switching (GMPLS), Optical Signaling and Routing Protocol (OSRP), Private Network to Network Interface (PNNI). The call information can include a Designated Transit List (DTL) or an Explicit Route Object (ERO), and wherein the new connection and the subsequent connection can include any of a subnetwork connection (SNC), a subnetwork connection protection (SNCP), and a label switched path (LSP) computed by a source node 110 of the plurality of nodes 110 and established by the distributed connection-oriented control plane 130.

Referring to FIG. 2, in an exemplary embodiment, a block diagram illustrates an exemplary node 110A for use with the systems and methods described herein. In an exemplary embodiment, the exemplary node 110A can be a network element that may consolidate the functionality of a multi-service provisioning platform (MSPP), digital cross connect (DCS), Ethernet and/or Optical Transport Network (OTN) switch, dense wave division multiplexed (DWDM) platform, etc. into a single, high-capacity intelligent switching system providing Layer 0, 1, and/or 2 consolidation. In another exemplary embodiment, the node 110A can be any of an OTN add/drop multiplexer (ADM), a multi-service provisioning platform (MSPP), a digital cross-connect (DCS), an optical cross-connect, an optical switch, a router, a switch, a wavelength division multiplexing (WDM) terminal, an access/aggregation device, etc. That is, the node 110A can be any digital system with ingress and egress digital signals and switching therebetween of channels, timeslots, tributary units, etc. While the node 110A is generally shown as an optical network element, the systems and methods contemplated for use with any switching fabric, network element, or network based thereon.

In an exemplary embodiment, the node 110A includes common equipment 210, one or more line modules 220, and one or more switch modules 230. The common equipment 210 can include power; a control module; operations, administration, maintenance, and provisioning (OAM&P) access; user interface ports; and the like. The common equipment 210 can connect to a management system 250 through a data communication network 260 (as well as a PCE, SDN controller, OpenFlow controller, etc.). The management system 250 can include a network management system (NMS), element management system (EMS), or the like. Additionally, the common equipment 210 can include a control plane processor, such as a controller 300 illustrated in FIG. 3, configured to operate the control plane 130 as described herein. The node 110A can include an interface 270 for communicatively coupling the common equipment 210, the line modules 220, and the switch modules 230 therebetween. For example, the interface 270 can be a backplane, mid-plane, a bus, optical or electrical connectors, or the like. The line modules 220 are configured to provide ingress and egress to the switch modules 230 and to external connections on the links 120 to/from the node 110A. In an exemplary embodiment, the line modules 220 can form ingress and egress switches with the switch modules 230 as center stage switches for a three-stage switch, e.g. a three stage Clos switch. Other configurations and/or architectures are also contemplated. The line modules 220 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, etc.

Further, the line modules 220 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N×1.25 Gb/s, and any rate in between. The line modules 220 can include wavelength division multiplexing interfaces, short reach interfaces, and the like, and can connect to other line modules 220 on remote network elements, end clients, edge routers, and the like, e.g. forming connections on the links 120. From a logical perspective, the line modules 220 provide ingress and egress ports to the node 110A, and each line module 220 can include one or more physical ports. The switch modules 230 are configured to switch channels, timeslots, tributary units, packets, etc. between the line modules 220. For example, the switch modules 230 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 230 can include Time Division Multiplexed (TDM) (i.e., circuit switching) and/or packet switching engines. The switch modules 230 can include redundancy as well, such as 1:1, 1:N, etc. In an exemplary embodiment, the switch modules 230 provide OTN switching and/or Ethernet switching.

Those of ordinary skill in the art will recognize the node 110A can include other components which are omitted for illustration purposes, and that the systems and methods described herein are contemplated for use with a plurality of different network elements with the node 110A presented as an exemplary type of network element. For example, in another exemplary embodiment, the node 110A may not include the switch modules 230, but rather have the corresponding functionality in the line modules 220 (or some equivalent) in a distributed fashion. For the node 110A, other architectures providing ingress, egress, and switching therebetween are also contemplated for the systems and methods described herein. In general, the systems and methods described herein contemplate use with any network element providing switching of channels, timeslots, tributary units, wavelengths, etc. and using the control plane 130. Furthermore, the node 110A is merely presented as one exemplary node 110A for the systems and methods described herein.

In an exemplary embodiment, the node 110A can include a plurality of ports with switching therebetween (e.g., via the line modules 220); and a controller operating a distributed connection-oriented control plane with a plurality of additional nodes in a network; wherein if the node is a source node for a connection, the controller is configured to: compute a path for the connection in the network; signal the path with or without a requirement for absolute route diversity with another connection in the network; receive a crankback with relevant call information if an intermediate node detects a diversity violation responsive to the requirement for absolute route diversity; and recompute the path exclusive of the relevant call information; wherein if the node is an intermediate node for the connection, the controller is configured to: receive a setup message from a source node for the connection; check if there is the requirement for absolute route diversity in the setup message; and determine if there is the absolute route diversity by checking relevant stored call information, and responsive to a diversity violation, send a crankback to the source node with the relevant call information included therein, and responsive to no diversity violation, storing the relevant call information.

Figure 3:
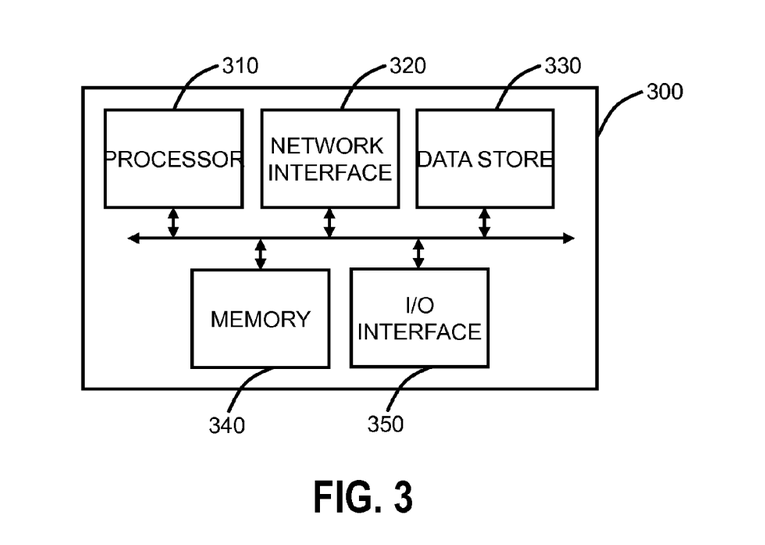
FIG. 3 is a block diagram of a controller to provide control plane processing and/or operations, administration, maintenance, and provisioning (OAM&P) for the node of FIG. 2.

Referring to FIG. 3, in an exemplary embodiment, a block diagram illustrates a controller 300 to provide control plane processing and/or operations, administration, maintenance, and provisioning (OAM&P) for the node 110A. The controller 300 can be part of common equipment, such as common equipment 210 in the node 110A, or a stand-alone device communicatively coupled to the node 110A via the DCN 260. The controller 300 can include a processor 310 which is hardware device for executing software instructions such as operating the control plane. The processor 310 can be any custom made or commercially available processor, a central processing unit (CPU), an auxiliary processor among several processors associated with the controller 300, a semiconductor-based microprocessor (in the form of a microchip or chip set), or generally any device for executing software instructions. When the controller 300 is in operation, the processor 310 is configured to execute software stored within memory, to communicate data to and from the memory, and to generally control operations of the controller 300 pursuant to the software instructions. The controller 300 can also include a network interface 320, a data store 330, memory 340, an I/O interface 350, and the like, all of which are communicatively coupled therebetween and with the processor 310.

The network interface 320 can be used to enable the controller 300 to communicate on the DCN 260, such as to communicate control plane information to other controllers, to the management system 250, and the like. The network interface 320 can include, for example, an Ethernet card (e.g., 10BaseT, Fast Ethernet, Gigabit Ethernet) or a wireless local area network (WLAN) card (e.g., 802.11). The network interface 320 can include address, control, and/or data connections to enable appropriate communications on the network. The data store 330 can be used to store data, such as control plane information, provisioning data, OAM&P data, etc. The data store 330 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 330 can incorporate electronic, magnetic, optical, and/or other types of storage media. The memory 340 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 340 may incorporate electronic, magnetic, optical, and/or other types of storage media. Note that the memory 340 can have a distributed architecture, where various components are situated remotely from one another, but may be accessed by the processor 310. The I/O interface 350 includes components for the controller 300 to communicate to other devices. Further, the I/O interface 350 includes components for the controller 300 to communicate with the other nodes, such as using overhead associated with OTN signals.

In an exemplary embodiment, the controller 300 is configured to communicate with other controllers 300 in the network 100 to operate the control plane 130 for control plane signaling. This communication may be either in-band or out-of-band. For SONET networks and similarly for SDH networks, the controllers 300 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 300 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. In the present invention, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling.

The controller 300 is configured to operate the control plane 130 in the network 100. That is, the controller 300 is configured to implement software, processes, algorithms, etc. that control configurable features of the network 100, such as automating discovery of the nodes 110, capacity on the links 120, port availability on the nodes 110, connectivity between ports; dissemination of topology and bandwidth information between the nodes 110; path computation and creation for connections; network level protection and restoration; and the like. As part of these functions, the controller 300 can include a topology database that maintains the current topology of the network 100 based on control plane signaling (e.g., HELLO messages) and a connection database that maintains available bandwidth on the links 120 again based on the control plane signaling. Again, the control plane 130 is a distributed control plane; thus a plurality of the controllers 300 can act together to operate the control plane 130 using the control plane signaling to maintain database synchronization. In source-based routing, the controller 300 at a source node for a connection is responsible for path computation and establishing by signaling other controllers 300 in the network 100. For example, the source node and its controller 300 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. Path computation generally includes determining a path, i.e. traversing the links 120 through the nodes 110 from the source node to the destination node based on a plurality of constraints such as administrative weights on the links 120, bandwidth availability on the links 120, etc.

Note, the controller 300 can be located at a source node, an intermediate node, or a destination node for a specific connection. In a conventional source-based routed, distributed control plane, the source node and its controller 300 will maintain a record of each call it initiates for a connection. The intermediate nodes and the destination node, while signaled from the source node to create the connection, do not retain a record of the overall path of the connection; however, each of the controllers 300 maintains a record of the bandwidth used on the links 120 as this reduces capacity for additional connections. If absolute route diversity is needed between two connections in a Close-Close service or a Close-Open service, this is not an issue with the conventional source-based routed, distributed control plane as the same source node computes the paths for both of the two connections and can simply ensure that they share none of the links 120, i.e. absolute route diversity can be considered one of the plurality of constraints. However, this situation is not available in an Open-Open service or Open-Close service since different source nodes will perform the path computation and they will not know if there are shared links 120, nodes 110, etc. when absolute route diversity is required between two connections.

Figure 4:
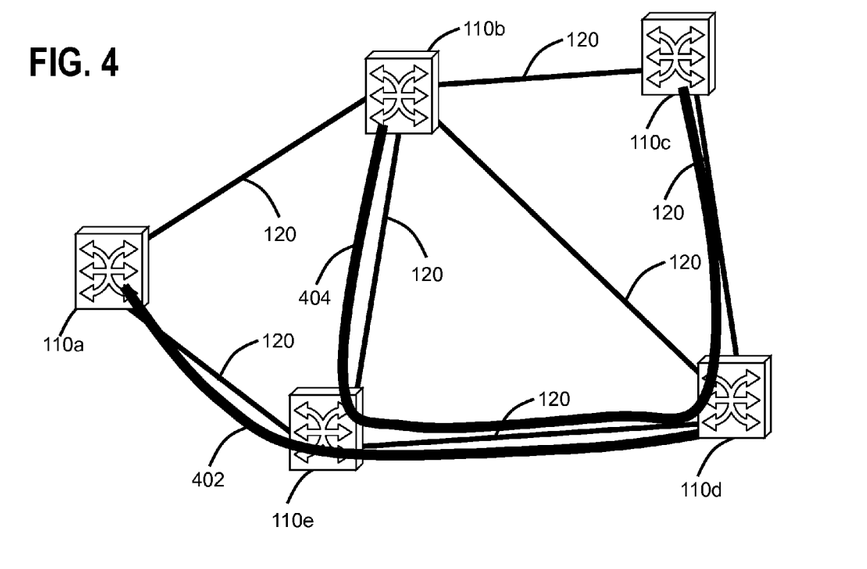
FIG. 4 is a network diagram of the exemplary network of FIG. 1 with two connections as an Open-Open service without absolute route diversity.
Figure 5:
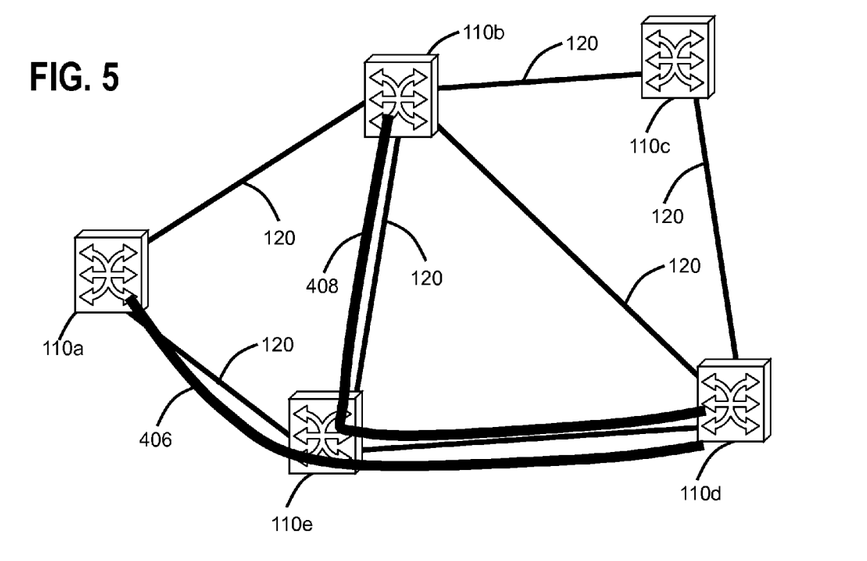
FIG. 5 is a network diagram of the exemplary network of FIG. 1 with two connections as an Open-Close service without absolute route diversity.

Referring to FIGS. 4 and 5, in an exemplary embodiment, a network diagram illustrates the exemplary network 100 with two connections 402, 404 as an Open-Open service (FIG. 4) and with two connections 406, 404 as an Open-Close service (FIG. 5). FIGS. 4 and 5 are illustrated to show the inability to guarantee absolute route diversity between the connections 402, 404 and the connections 406, 408 with a conventional source-based routed, distributed control plane when the source nodes are different. In FIG. 4, the connection 402 is required from the node 110a to the node 110d, the connection 404 is required from the node 110b and the node 110c, and the connections 402, 404 are an Open-Open service, i.e. related to one another and need absolute route diversity therebetween. The node 110a computes the path for the connection 402 between the nodes 110a, 110e, 110d, and the node 110b computes the path for the connection 404 between the nodes 110b, 110e, 110d, 110c. In FIG. 5, the connection 406 is required from the node 110a to the node 110d, the connection 408 is required from the node 110b to the node 110d, and the connections 406, 408 are an Open-Close service, i.e. related to one another and need absolute route diversity therebetween. The node 110a computes the path for the connection 406 between the nodes 110a, 110e, 110d, and the node 110b computes the path for the connection 404 between the nodes 110b, 110e, 110d.

Once established, the connections 402, 404 and the connections 406, 408 share the link 120 between the nodes 110e, 110d and thus do not have absolute route diversity. The nodes 110a, 110b do not communicate the different DTLs or EROs between one another, nor does the intermediate node 110e retain the DTLs or EROs in the conventional source-based routed, distributed control plane. Note, the connections 402, 404 and the connections 406, 408 lack absolute route diversity from a link perspective (sharing the link between the nodes 110e, 110d) and from a nodal perspective (sharing the nodes 110e, 110d). In other exemplary embodiments, connections could lack nodal diversity only, i.e. sharing the same node 110, but not the same link 120.

Figure 6:
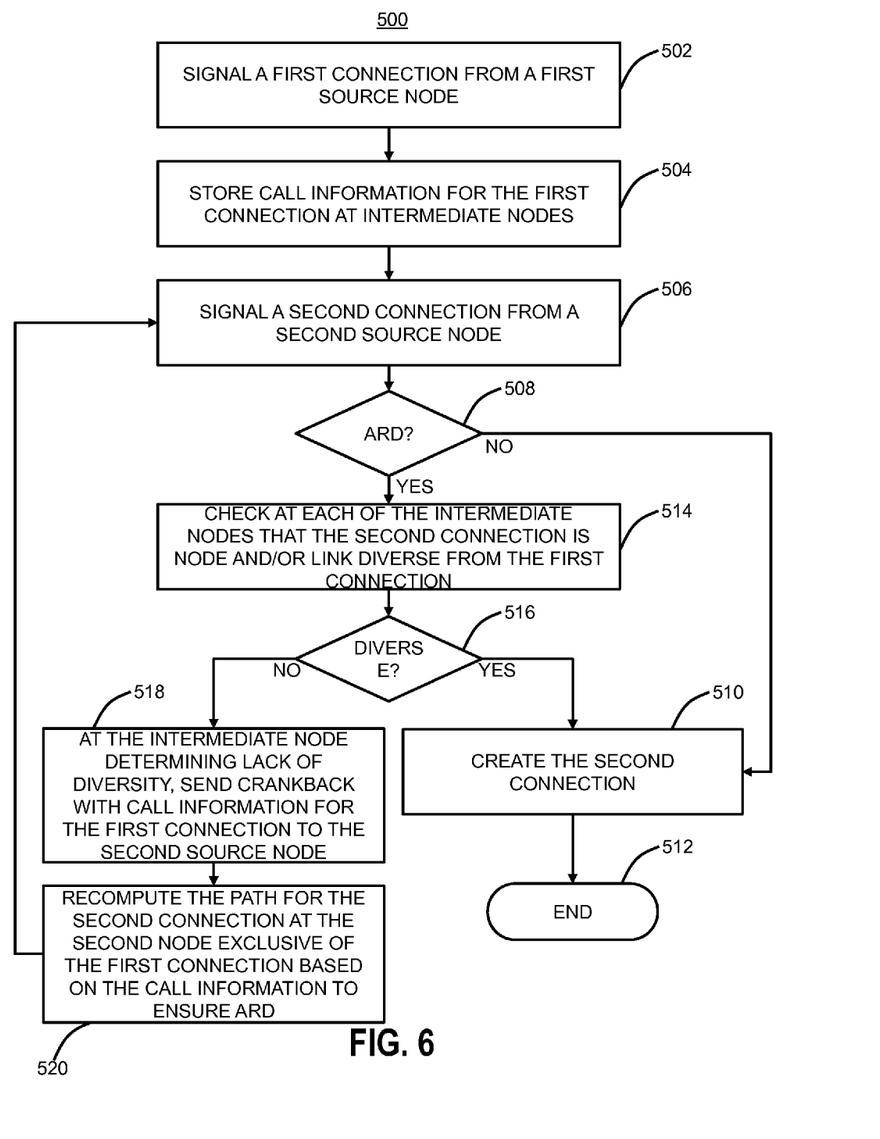
FIG. 6 is a flowchart of a method ensuring absolute route diversity between connections having diverse source nodes and signaled by a distributed connection-oriented control plane.

Referring to FIG. 6, in an exemplary embodiment, a flowchart illustrates a method 500 ensuring absolute route diversity between connections having diverse source nodes and signaled by a distributed connection-oriented control plane. The method 500 contemplates operation in the network 100 by the control plane 130 (and associated nodes 110 and their controllers 300). The distributed connection-oriented control plane can include GMPLS, ASON, OSRP, PNNI, etc. The method 500, while ensuring ARD between Open-Open services or Open-Close services, can be utilized with Close-Close services and/or Close-Open services as well. The gist of the method 500 is to retain call information for created connections at intermediate nodes. If a subsequent connection requires absolute route diversity from a previously created connection, each of the intermediate nodes can check the existing call information, and if absolute route diversity is lacking (e.g., node and/or link diversity), the intermediate node determining the lack of diversity can signal a crankback to the source node along with the call information for the already created connection. The source node can then recompute the path exclusive of the already created connection. Advantageously, to create N diverse connections, the method 500 can perform this with at most N−1 crankbacks.

The method 500 begins with a first source node computing a path for a first connection and signaling the path (step 502). As described herein, the connections can include, without limitation, SNCs, SNCPs, LSPs, etc., i.e. an end-to-end signaled path via the control plane. Call information is stored for the first connection at each intermediate node and the first connection is created at each intermediate node (step 504). Here, each of the intermediate nodes in the path of the first connection store the DTL, ERO, etc. defining the first connection as well as an identifier of the first connection. This can be stored via the controller 300 for future use. Further, this can be for all connections in the network 100. This is significant as conventionally, in the distributed connection-oriented control plane, the intermediate nodes do not retain the DTL, ERO, etc. of connections passing through.

Next, a second source node computes a path for a second connection and signals the path (step 506). Note, the second source node can be the same as the first source node in Close-Close services or Close-Open services. Also, the second source node can be different from the first source node is Open-Open services and Open-Close services. The method 500 includes an indicator that the second connection needs to be absolute route diverse from the first connection (step 508). This can include identifying the first connection via its identifier and marking a flag in a setup message. For example, the setup message can be the PATH message in RSVP-TE/CR-LDP or the SETUP message in PNNI. The flag can indicate a type of diversity, i.e. nodal and/or link. If the second connection does not require absolute route diverse (step 508), the method 500 includes creating the second connection (step 510) and ends (step 512). Note, the step 508 can allow the method 500 to be used on any connection created by the control plane as it avoids the comparison steps at the intermediate nodes if there is no need for absolute route diversity.

If the second connection is identified to require absolute route diversity from the first connection (step 508), the method 500 includes checking the second connection at each of the intermediate nodes to ensure it is node and/or link diverse from the first connection (step 516). Here, each of the intermediate nodes utilize their stored call information for the first connection to check the second connection. If none of the intermediate nodes determine a lack of diversity between the first connection and the second connection (step 516), the method 500 includes creating the second connection (step 510) and ends (step 512). If one of the intermediate nodes detects a lack of diversity between the first connection and the second connection (step 516), the detecting intermediate node sends a CRANKBACK message to the second source node with the call information of the first connection included therein (step 518). The CRANKBACK message informs the second source node that the second connection cannot be created, i.e. establishment/signaling for the second connection is rejected. The CRANKBACK message carries the route for the first connection (e.g., ERO in RSVP-TE/CR-LDP or DTL in PNNI) that resulted in the diversity violation.

Upon receipt of the CRANKBACK message, the second source node can recompute the path of the second connection exclusive of the first connection based on the call information to ensure absolute route diversity (either nodal and/or link) (step 520). Here, the second source node can provide an alternate path for the second connection excluding nodes and/or links associated with the first connection. Subsequent to the recomputed path, the method 500 can return to the step 506 to establish the second connection. If no diverse route can be computed by the second source node, then the connection establishment is abandoned for a pre-defined duration, e.g. 30 seconds, i.e. the connection goes to "sleep" for 30 seconds, and as it goes to "sleep" all the route information received in CRANKBACK message(s) is lost. When the connection "wakes up", the source node again attempts to route the connection, initially without any diversity info, and this again may result in at most one CRANKBACK and another "sleep" or successful establishment. As a further extension, if no diverse route to destination is found, then the source node could calculate a pair of routes (for itself and for the peer connection) and then could notify peer source node to re-groom to suggested route so that both connections could get established over diverse path.

Advantageously, the method 500 can establish absolute route diversity in Open-Open services or Open-Close services with potentially the cost of at most one CRANKBACK. Another advantage is the method 500 guarantees absolute route diversity without a complex implementation and minor modification to existing control plane behavior. That is, the method 500 avoids increased control plane signaling to share route information. Rather, the method 500 relies on existing signaling—store DTLs or EROs at intermediate nodes—which does not increase control plane signaling traffic, and the cost of a single CRANKBACK to ensure absolute route diversity. The CRANKBACK is an existing mechanism, and the method 500 only modifies the CRANKBACK message to include the ERO or DTL of the first connection. Stated differently, the method 500 is less complex that having one peer (the first source node) notify its peer (the second source node) of the DTL or ERO of the first connection. Also, this does not require both of the source nodes to stay up to receive a DTL message from their peer node.

The method 500 is illustrated with respect to two connections—the first connection and the second connection. Those of ordinary skill in the art will recognize the method 500 is scalable to N connections, i.e. a group of N connections requiring absolute route diversity therebetween. The method 500 can store the DTL or ERO of the second connection as well at the intermediate nodes, along with the DTL or ERO of all of the N connections. The method 500 can repeat the steps to detect absolute route diversity for the $M^{th}$ connection by checking at each of the intermediate nodes that the $M^{th}$ connection is absolute route diverse from the previous M−1 connections. In this manner, setting up the N connections will require at most N−1 CRANKBACKS. The source node must keep track of N−1 routes (or their information depending on the nature of diversity: nodal or link) received in the resulting N−1 CRANKBACK messages.

The method 500 can be used for initial connections, i.e., setting up the first connection and then the second connection with checks for diversity. Note, the method 500 can also be used for reasons such as restoration responsive to a failure, or as part of connection maintenance to permanently or temporarily move the connection to a different route, i.e., the method 500 does not just apply to initial connection setup but can be used in any scenario for signaling two or more connections. The method 500 can be used anytime connections with disparate sourced nodes require diversity therebetween.

Figure 7:
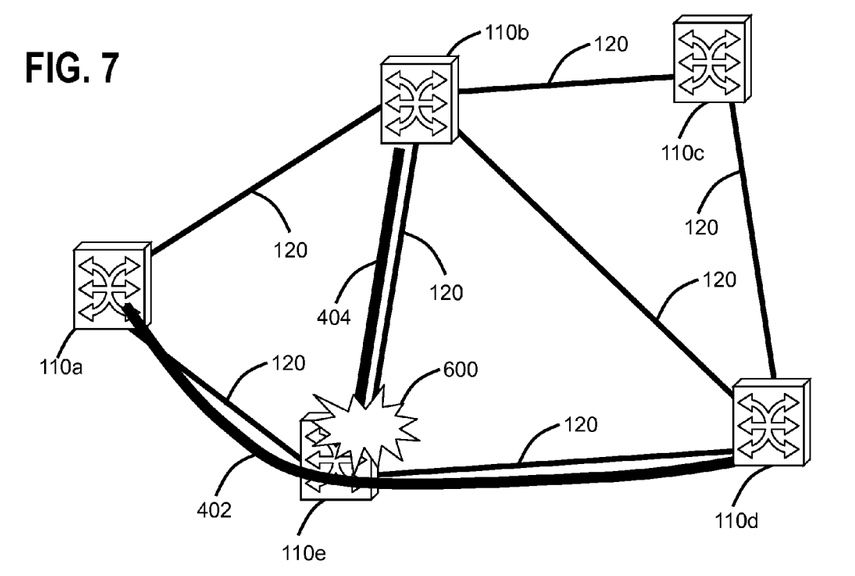
FIGS. 7 and 8 are a network diagram of the exemplary network of FIG. 1 with the two connections as an Open-Open service from FIG. 4 illustrating an operation of the method of FIG. 6.
Figure 8:
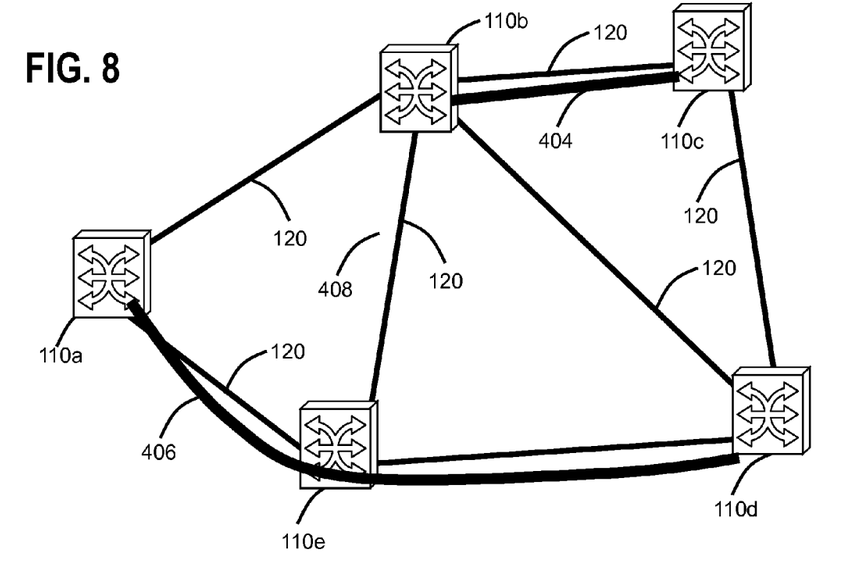

Referring to FIGS. 7 and 8, in an exemplary embodiment, a network diagram illustrates the exemplary network 100 with the two connections 402, 404 as an Open-Open service from FIG. 4 illustrating an operation of the method 500. In FIG. 7, the connection 402 is required from the node 110a to the node 110d, the connection 404 is required from the node 110b and the node 110c, and the connections 402, 404 are an Open-Open service, i.e. related to one another and need absolute route diversity therebetween. The node 110a computes the path for the connection 402 between the nodes 110a, 110e, 110d, and the node 110b computes the path for the connection 404 between the nodes 110b, 110e, 110d, 110c. The node 110a signals the connection 402 through the nodes 110e, 110d and the connection 402 is established with the node 110e retaining the DTL or ERO for the connection 402. The node 110b signals the connection 404 to the node 110e which compares the connection 404 to the DTL or ERO of the connection 402 and determines lack of diversity and causes a CRANKBACK 600 which is signaled to the node 110b with the DTL or ERO of the connection 402. In FIG. 8, the node 110b recomputes the connection 404 exclusive of the DTL or ERO of the connection 402, i.e. the node 110b avoids the node 110e and the node 110d in the computation and associated links 120. Here, the node 110b determines the recomputed path between the nodes 110b, 110c and signals this path which is created in FIG. 8 at the cost of the CRANKBACK 600.

Figure 9:
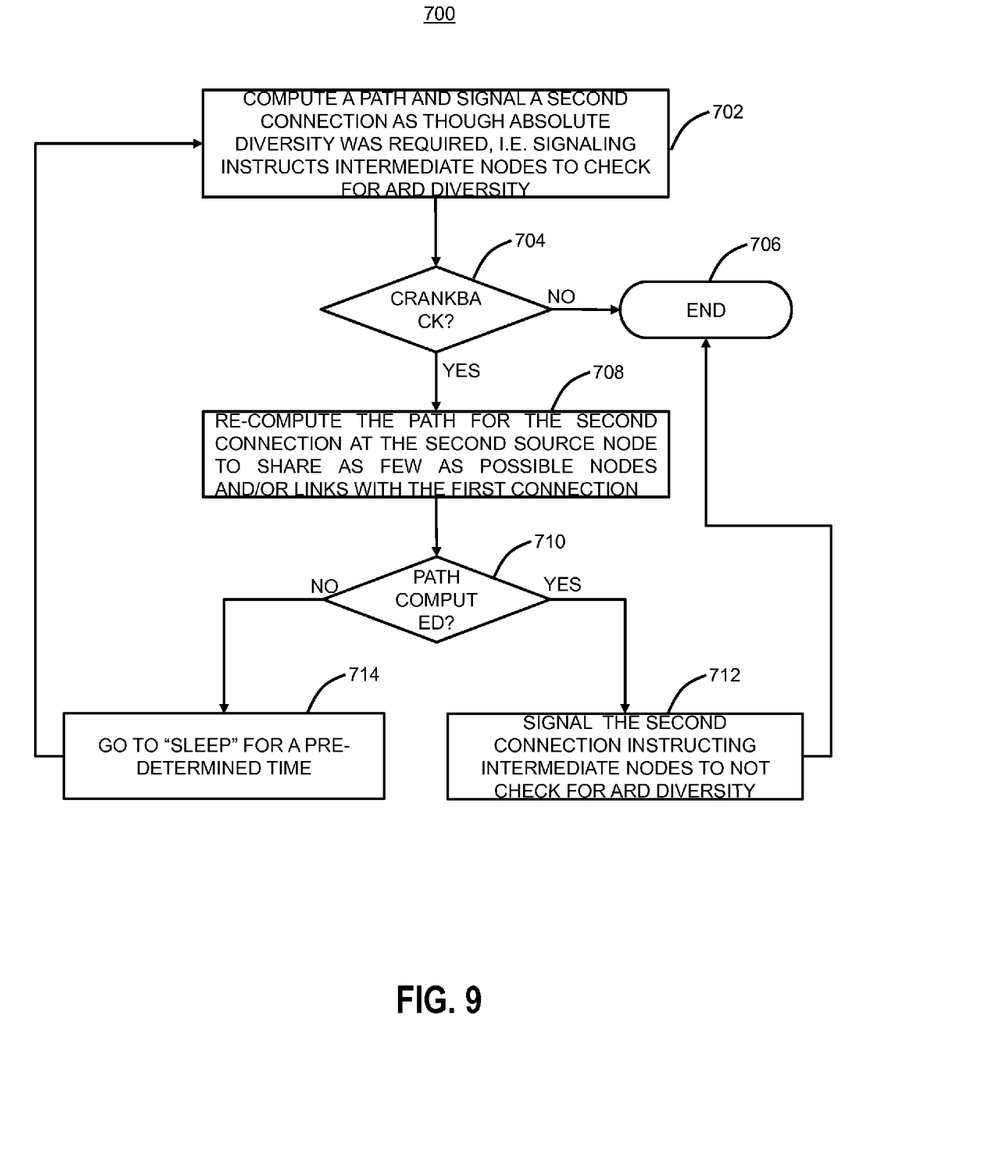
FIG. 9 is a flowchart of a method ensuring maximal route diversity between connections having diverse source nodes and signaled by a distributed connection-oriented control plane.

Referring to FIG. 9, in an exemplary embodiment, a flowchart illustrates a method 700 ensuring maximal route diversity between connections having disparate source nodes and signaled by a distributed connection-oriented control plane. The method 700 contemplates operation in the network 100 by the control plane 130 (and associated nodes 110 and their controllers 300). Again, the distributed connection-oriented control plane can include GMPLS, ASON, OSRP, PNNI, etc. The method 700, while ensuring maximal route diversity between Open-Open services or Open-Close services, can be utilized with Close-Close services and/or Close-Open services as well. The method 700 relies on and extends method 500 to provide maximal route diversity instead of absolute route diversity. Again, absolute route diversity is where routes for two or more connections are totally diverse with respect to node(s) and/or link(s). In some (many) real life instances absolute route diversity may not be achievable and it may be perfectly acceptable for two or more connections to be as diverse to each other as possible, i.e. to share as few (including zero) nodes and/or links among each other as possible. This situation can be referred to as maximal route diversity. Note that absolute route diversity is a valid instance of maximal route diversity, but not the other way around.

With reference to FIG. 9 which relies on and extends the method 500 of FIG. 6 to accomplish maximal diversity, the method 700 calculates a path and signals the second connection as though absolute route diversity (ARD) is required (step 702), i.e. intermediate nodes are instructed to check that the second connection is node and/or link (ARD) diverse to the first connection. This includes performing steps 506, 508, 514, and 516 of method 500 in FIG. 6. If crankback of step 518 of FIG. 6 does not occur (step 704), then the method 700 ends (step 706), i.e., the second connection got established along a maximally diverse route which is the same as an absolutely diverse route to the first connection. Otherwise, crankback of step 518 of FIG. 6 has occurred (step 704) and the source node of the second connection has learned the route of the first connection (e.g., via a DTL, ERO, etc.). In this case, the method 700 attempts to re-calculate a path for the second connection to share as few as possible nodes and/or links with the first connection (step 708), i.e., re-calculate a maximally diverse path to the first connection. If such a maximally diverse path was computed (step 710), then the second connection is signaled again, but this time the intermediate nodes are instructed to not check for node and/or link (ARD) diversity to the first connection (step 712). This should result in the second connection getting successfully established in the network and thus the method 700 ends (step 706). If the maximally diverse path could not be computed (step 710), then the establishment of the second connection is abandoned for a pre-defined duration, e.g., 30 seconds, i.e., the connection goes to "sleep" for 30 seconds (step 714). When the second connection "wakes up", the method 700 is restarted (step 702).

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method in a network utilizing a distributed connection-oriented control plane, comprising:
signaling a first path for a first connection from a first source node;
storing call information for the first connection at any intermediate nodes in the first path;
signaling a second path for a second connection from a second source node, wherein the signaling comprises:
checking at any intermediate nodes in the second path if there is absolute route diversity between the first connection and the second connection responsive to a requirement therein; and
responsive to detecting a diversity violation at an intermediate node of the any intermediate nodes in the second path, signaling a crankback to the second source node with the call information for the first connection included therein;
failing to recompute the second path exclusive of the first path based on the call information responsive to the crankback due to no available diverse path;
recomputing the second path to be maximally diverse from the first path sharing as few nodes and/or links as possible with the first path; and
signaling the second path instructing the any intermediate nodes that it is not required to check for the node and/or link diversity.

2. The method of claim 1, further comprising:
recomputing the second path exclusive of the first path based on the call information responsive to the crankback.

3. The method of claim 1, further comprising:
checking at any intermediate nodes in the second path if there is nodal and/or link diversity based on the requirement, wherein the requirement is communicated in a setup message associated with the second connection.

4. The method of claim 1, further comprising:
responsive to not detecting the diversity violation at the any intermediate nodes in the second path, establishing the second connection without requiring call coordination between the first connection and the second connection.

5. The method of claim 1, wherein the first connection and the second connection comprise any of an Open-Open service, an Open-Close service, a Close-Open service, and a Close-Close service.

6. The method of claim 5, wherein the first connection and the second connection comprise any of the Close-Open service and the Close-Close service, and the checking is not performed due to a lack of the requirement.

7. The method of claim 1, wherein the distributed connection-oriented control plane comprises any of Automatically Switched Optical Network (ASON), Generalized Multi-Protocol Label Switching (GMPLS), Optical Signaling and Routing Protocol (OSRP), Private Network to Network Interface (PNNI).

8. The method of claim 1, further comprising:
storing call information for the second connection at the any intermediate nodes in the second path, wherein the first connection and the second connection are part of N connections;
establishing the N connections as diverse therebetween with a maximum of N−1 crankbacks.

9. The method of claim 1, wherein the call information comprises a Designated Transit List (DTL) or an Explicit Route Object (ERO).

10. The method of claim 1, wherein the first connection and the second connection are part of a subnetwork connection protection (SNCP) with the first source node and the second source node being different.

11. The method of claim 1, wherein the first connection and the second connection comprise any of a subnetwork connection (SNC), a subnetwork connection protection (SNCP), and a label switched path (LSP) computed by a source node and established by the distributed connection-oriented control plane.

12. The method of claim 1, further comprising:
performing the signaling the first path or signaling the second path responsive to restoration from a failure or as part of connection maintenance.

13. A network utilizing a distributed connection-oriented control plane, comprising:
a plurality of nodes interconnected therebetween by a plurality of links, wherein the distributed connection-oriented control plane operates between the plurality of nodes;
wherein, responsive to control plane signaling for a new connection, any intermediate nodes of the plurality of nodes in a first path for the new connection store associated call information for the new connection;
wherein, responsive to control plane signaling for a subsequent connection after the new connection and a requirement for absolute route diversity with the new connection and any other connections, any intermediate nodes of the plurality of nodes in a second path for the subsequent connection check, during the control plane signaling for the subsequent connection, for the absolute route diversity based on stored call information;
wherein, responsive to a diversity violation at an intermediate node of the any intermediate nodes in the second path for the subsequent connection, during the check, a crankback is sent to a source node of the subsequent connection with relevant stored call information for the new connection included therein; and
wherein, responsive to failing to recompute the second path exclusive of the first path based on the call information responsive to the crankback due to no available diverse path, the second path is recomputed to be maximally diverse from the first path sharing as few nodes and/or links as possible with the first path; and the second path is signaled instructing the any intermediate nodes that it is not required to check for the node and/or link diversity.

14. The network of claim 13, wherein the source node of the subsequent connection recomputes the second path for the subsequent connection exclusive of the relevant stored call information included therein responsive to the crankback.

15. The network of claim 13, wherein, responsive to not detecting the diversity violation at the any intermediate nodes in the second path for the subsequent connection, the subsequent connection is established without requiring call coordination.

16. The network of claim 13, wherein the new connection and the subsequent connection comprise any of an Open-Open service, an Open-Close service, a Close-Open service, and a Close-Close service.

17. The network of claim 16, wherein the new connection and the subsequent connection comprise any of the Close-Open service and the Close-Close service, and the checking is not performed due to a lack of the requirement.

18. The network of claim 13, wherein the distributed connection-oriented control plane comprises any of Automatically Switched Optical Network (ASON), Generalized Multi-Protocol Label Switching (GMPLS), Optical Signaling and Routing Protocol (OSRP), Private Network to Network Interface (PNNI);
wherein the call information comprises a Designated Transit List (DTL) or an Explicit Route Object (ERO); and
wherein the new connection and the subsequent connection comprise any of a subnetwork connection (SNC), a subnetwork connection protection (SNCP), and a label switched path (LSP) computed by a source node of the plurality of nodes and established by the distributed connection-oriented control plane.

19. A node, comprising:
a plurality of ports with switching therebetween; and
a controller operating a distributed connection-oriented control plane with a plurality of additional nodes in a network;
wherein if the node is a source node for a connection, the controller is configured to:
compute a path for the connection in the network;
signal the path with or without a requirement for absolute route diversity with another connection in the network;
receive a crankback with relevant call information of the another connection if an intermediate node detects a diversity violation responsive to the requirement for absolute route diversity; and
recompute the path exclusive the another connection based on the relevant call information;
wherein if the node is an intermediate node for the connection, the controller is configured to:
receive a setup message from a source node for the connection;
check if there is the requirement for absolute route diversity in the setup message; and
determine if there is the absolute route diversity by checking relevant stored call information, and responsive to a diversity violation, send a crankback to the source node with the relevant call information included therein, and responsive to no diversity violation, storing the relevant call information; and
wherein, responsive to failing to recompute the path exclusive of the first path based on the call information responsive to the crankback due to no available diverse path, the path is recomputed to be maximally diverse from the another connection sharing as few nodes and/or links as possible with the another connection; and the path is signaled instructing any intermediate nodes that it is not required to check for the node and/or link diversity.

* * * * *